United States Patent Office 3,262,916
Patented July 26, 1966

3,262,916
EPOXYAMINES
Van R. Gaertner, Ballwin, Mo., assignor to Monsanto
Company, a corporation of Delaware
No Drawing. Filed Sept. 24, 1962, Ser. No. 226,198
13 Claims. (Cl. 260—78.4)

This invention relates to amino epoxides, and to their preparation and uses. More particularly this invention provides new and useful mono-substituted N-monoglycidylamines, methods for preparing the same, and uses as monomers in the preparation of linear polyester compositions.

Attempts, made prior to this invention, to prepare n-alkyl-N-glycidylamines by reacting the n-alkylamine with an epihalohydrin in equimolar quantities to obtain 1-alkylamino-3-chloro-2-propanols, i.e., 1:1 adducts containing 1 alkyl group and 1 haloalkanol group, have always failed because of the instability and higher reactivity toward epihalohydrin of the resulting product.

It is an object of this invention to provide new stable, distillable mono-substituted mono-glycidylamine.

It is a further object of this invention to provide a method for preparing stable, mono-substituted monoglycidylamines.

It is a further object of this invention to provide mono-substituted monoglycidylamines which are useful as monomers in the preparation of linear polyester compositions.

It is a further object of this invention to provide novel copolymer compositions derived from mono-substituted mono-glycidylamines.

Other objects, aspects, and advantages of this invention will be apparent from a reading of the accompanying specification and the appended claims.

According to this invention there are provided, as new compounds, primary tert-alkyl-N-glycidylamines of the formula

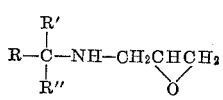

wherein R, R', and R" are alkyl radicals, one of which contains from 1 to 21 carbon atoms, and the other two of which are lower alkyl groups containing from 1 to 6 carbon atoms.

The above described compounds are prepared according to this invention by contacting an epihalohydrin with a tert-alkylamine in the presence of an hydroxyl-containing solvent, and then contacting the resulting reaction product with an aqueous basic material to dehydrohalogenate the reaction product. These steps are summarized by the following general chemical equations:

(1)
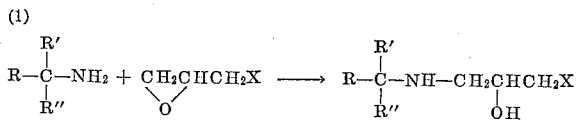

(2)
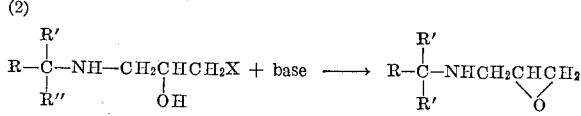

In preparing the compounds of this invention there are used as reactants primary tert-alkylamines as described above.

It has been found according to this invention that the tert-alkyl group decreases the reactivity of the intermediate aminochloropropanol (Equation 1) toward an epihalohydrin because of steric hindrance and permits isolation of good yields of the crude intermediate. Such products cannot be prepared in appreciable yields from n-alkylamines or other relatively unhindered alkylamines because the intermediate reacts *more* rapidly with an epihalohydrin than does the starting primary amine.

This same tert-alkyl group stabilizes the final tert- alkyl-glycidylamine product; such cannot be isolated from straight-chain primary alkylamines because of their ease of polymerization. The tert-alkylamines may be prepared by any of several known methods, an example of which is the method described by Ritter, J. J., et al., in JACS, 70, pages 4048 to 4050. Examples of useful tert-alkyl-amines include tert-butylamine, tert-pentylamine, tert-octylamine, tert-dodecylamine, tert-hexadecylamine, tert-octadecylamine, tert-nonadecylamine, tert-eicosylamine, tert-docosylamine, etc.

In preparing the compounds of this invention, a tert-alkylamine of the type exemplified above is reacted with an epihalohydrin such as epichlorohydrin, epibromohydrin, or epiiodohydrin, sufficient to replace one amino hydrogen with the respective haloalkanol group. The tert-alkylamine reactant is preferably used in excess, although equimolar proportions or slight excesses of epichlorohydrin may be used provided the reaction is controlled and stopped when the 1:1 amine:epihalohydrin adduct is obtained. The reaction is conducted at a temperature not above 50° C. and preferably at a temperature of from 10 to 35° and is catalyzed or at least initiated by the presence of at least a trace amount of an hydroxyl-containing material. The hydroxyl-containing material is essential in the sense that in its absence the reaction does not proceed. The hydroxyl-containing material may be supplied by any of a number of sources. For example, the solvent used to prepare such starting materials such as methanol, ethanol, propanol, or isopropanol, preferably methanol, each contain hydroxyl radicals and such would serve to function as the hydroxyl-containing material. The hydroxyl-containing material is also supplied by some of the intermediate products which are formed since the haloalkanol groups thereof also contain hydroxyl groups. The trace amounts of water normally present in hydrocarbon solvents which are commercially available also serve to initiate the reaction. However, anhydrous hydrocarbon solvents such as anhydrous hexane, would not serve to catalyze or initiate the reaction. The hydroxyl-containing material may be supplied by any other source such as phenol, or the alkylene glycols, such as ethylene glycol, propylene glycol, etc. Beyond requiring its presence, there are no critical limits as to the amount of the hydroxyl-containing material that must or may be present in the reaction mixture. When the reaction between the primary amine and the epihalohydrin used is completed any excess epihalohydrin or excess amine and solvent may be distilled or flashed off under reduced pressure not above 50° C. It is not necessary to remove all of the solvent but it is desired to remove substantially all of any excess reactant.

After any excess epihalohydrin or excess tert-alkylamine has been removed the haloalkanol-substituted tert-alkyl-amine may be treated immediately with an anhydrous or aqueous basic material to dehydrohalogenate the haloalkanol group and form the respective epoxyalkyl group. The aqueous basic material is generally the oxide, hydroxide, carbonate or bicarbonate of an alkali metal or alkaline earth metal admixed with water to provide an efficient working basic material. Examples of such basic materials include: sodium, potassium, lithium, calcium, barium, strontium, and magnesium oxide, hydroxides, carbonates, and bicarbonates. Most preferred examples are the plentiful, inexpensive basic materials such as sodium hydroxide, potassium hydroxide, sodium and potassium bicarbonate, calcium and magnesium oxides, and mixtures thereof. Aqueous solutions and suspensions of such materials in dilute or concentrated form can be used. Generally, concentrations of the basic material on the order of 0.1 to 15 N can be used with concentrations on the order of those equivalent to a 10% to 50% by weight solution being preferred. However, it should be understood that these concentrations of aqueous basic material are given only as examples, since the concentration of the basic material used is not critical. For example, the basic material may be added as a solid material to liquid medium containing the haloalkanol-substituted tert-alkylamine. The aqueous basic material is usually used in excess molar proportions to insure complete reaction. The reaction between the aqueous alkali with the haloalkanol-substituted tert-alkylamines generally takes from a few minutes to several hours at normal room temperature. When the dehydrohalogenation reaction is completed the excess aqueous basic material is removed by any of several methods known in the art, for example, by titration with acid, by separation of the aqueous basic layer from the organic layer containing the product, and by absorbing the last traces of alkali with absorbent materials, such as decolorizing charcoal.

Examples of products of this invention obtained by the above described procedure are the N-(2,3-epoxypropyl)-monosubstituted derivatives of tert-butylamine (1,1-dimethylethylamine), 1-ethyl-1-methylpropylamine, 1,1-diethylhexylamine, 1-methyl-1-propyldecylamine, 1,1-dibutylhexadecylamine, and tert-alkylamines derived from the use of highly branched olefins such as diisobutene, triisobutylene, pentaisobutylene, etc. with hydrogen cyanide to give the formides which are hydrolyzed to give the respective amines.

The N-(2,3-epoxypropyl)-tert-alkylamines of this invention are particularly useful as intermediates in the preparation of linear soluble polyesters. For example N-(2,3-epoxypropyl)-tert-butylamine can be reacted with an alkenyl cyclic dibasic acid anhydride, such as branched chain dodecenylsuccinic anhydride, to obtain a soluble linear polymer which can be used in combination with hydrophobic compounds such as octadecyl propiolate to size paper product.

The polyester compounds of this invention are prepared by reacting N-(2,3-epoxypropyl)-tert-alkylamine of the above described type with cyclic acid anhydrides of succinic and glutaric acids. These acid anhydrides preferably have a side-chain of from 6 to 20 carbon atoms. Particularly suitable acid anhydrides are those prepared by condensing compounds of from 6 to 20 carbon atoms such as mono-olefins, alkyl chlorides or aliphatic alcohols with alpha, beta-unsaturated acid anhydrides or the esters thereof in the manner described in Patents 2,283,214 and 2,380,699. It is particularly preferred to use the condensation products of olefins such as diisobutylene, triisobutylene, tetraisobutylene, tetrapropylene, etc., with maleic anhydride; the substituted succinic and glutaric acids obtained must be in the form of anhydrides for the esterification process of the present invention, as little or no esterification takes place when the free dicarboxylic acids are reacted. The aforenamed polyalkylenes can, for example, be prepared by polymerization of isobutylene or propylene with sulfuric acid or metal halides, or result from simultaneous dehydration and polymerization of tert-butyl alcohol or isopropyl alcohol by concentrated sulfuric acid.

It is usually desirable in the process of preparing the polyesters of this invention to react the aliphatic hydrocarbon or oxahydrocarbon-substituted succinic or glutaric acid anhydride with the N-(2,3-epoxypropyl)-tert-alkylamine in approximately equal molar amounts. However, smaller amounts of the anhydride reactant can be used, for example, 0.25 up to 1 mole of the cyclic acid anhydride for each mole of the amine. The reaction is conducted by mixing the reactants together usually in the presence of a solvent and allowing the reaction to proceed. Although reaction will take place slowly at room temperature optimum results are obtained when the reaction mixture is stirred and gently heated to from 50° to 120° C. for from 15 minutes to 18 hours. The shorter reaction time is ordinarily used with a higher reaction temperature. With the preferred reactants, it is normally sufficient to heat the mixture to from 70 to 90° C. for from 30 minutes to 2 hours to obtain almost quantitative yields of the polyester product. The usual solvents can be used and include: benzene, toluene, hexane, cyclohexane, decahydronaphthalene, dioxane, dimethylformamide, etc.

The invention is further illustrated by the following examples:

Example 1

A technical grade of tert-butylamine, 109 g., was dissolved exothermically in 105 g. of methanol; the solution was cooled to 20° C. in an ice-water bath and 92.5 g. of epichlorohydrin was added rapidly. After stirring and sampling for analysis, the mixture was maintained below 25° for 22.5 hours when analysis indicated that 100% of the initial oxirane content had been utilized in the reaction. Analysis was carried out on aliquots by the Durbetaki titration with hydrogen bromide in acetic acid.

The solution was aspirated below 35° to remove methanol and excess tert-butylamine, leaving an amber oily residue containing a crystalline solid. The oil was dissolved in 250 ml. anhydrous ether, filtered to remove the solid (identified in another experiment as tert-butylamine hydrochloride), and the filtrate again aspirated below 20° leaving 146.3 g. of a turbid oil; neutralization equivalent 157. The theoretical value for

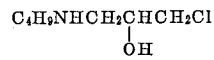

is 165.6.

This oil (145.8 g.) was immediately dissolved in 100 ml. ether and then treated rapidly, with ice bath cooling and stirring with 100 g. of 50% aqueous potassium hydroxide solution and stirred 30 min. below 25°. The organic layer was separated and again stirred with a fresh portion of the 50% alkali.

The organic layer was finally dried and the reaction completed by stirring with two portions of potassium hydroxide pellets. Finally traces of alkali were removed from the solution by stirring it with decolorizing charcoal until added thymolphthalein indicated that no alkali was present (blue color became light yellow).

The filtered solution was aspirated to remove ether and the crude oily product (104 g. of 105.1 g. total) was distilled rapidly at 11 mm., the major portion at 57° C.; the product, N-(2,3-epoxypropyl)-tert-butylamine, a colorless mobile liquid, $n_D^{25}$ 1.4304–1.4307, had an ammoniacal odor and weighed 75.1 g. corresponding to 59% yield based on epichlorohydrin.

A redistilled sample, B.P. 54–55°/10 mm., contained 64.91% carbon, 11.64% hydrogen, and 10.78% nitrogen, compared to the calculated values for tert-butylglycidylamine, $C_7H_{15}NO$, of 65.1% carbon, 11.7% hydrogen and 10.8% nitrogen. It contained 12.3% oxirane oxygen (by the Durbetaki method, corrected for amine content) and this value did not change when a sample was stored for more than five months in the deep-freeze at −23° C. The calculated oxirane content is 12.4% oxygen.

Other runs using excess epichlorohydrin or equimolar proportions of the starting materials resulted in lesser yields. Considerable polymerization occurred if precautions to remove traces of alkali were not taken before distillation of the crude glycidylamine.

Example 2

A tert-octylamine with the structure 1,1,3,3-tetramethyl-1-butylamine, 97 g., was dissolved in 201.3 g. methanol, cooled and rapidly treated with 92.5 g. epichlorohydrin below 25° C. After sampling, the solution was stirred for 17.5 hours at 20–25° when analysis indicated that 75% of the epichlorohydrin had reacted, i.e., equimolar reaction with the amine had occurred.

The solvent and excess epichlorohydrin were removed below 30°/5 mm., leaving 169.8 g. of turbid viscous yellow oil, which had a neutralization equivalent of 222 (calculated for

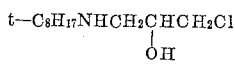

N.E.=221.8).

This oil was promptly dehydrohalogenated with alkali as in Example 1, and gave 80.7 g. of mobile crude product, $n_D^{25}$ 1.4527. A 72.6 g. portion was rapidly distilled, yielding a total of 55.4 g., B.P. 65–73°/0.4–0.8 mm. mainly, $n_D^{25}$ 1.4483–1.4517; 9.3 g. of higher boiling oil and 2.0 g. of residual resin were also obtained. The main cuts corresponded to 61.6 g., a 66.4% yield based on the starting amine; it contained 8.36% oxirane oxygen.

A redistilled sample, B.P. 65–67°/1 mm., $n_D^{25}$ 1.4492, contained 71.19 and 70.99% carbon, 12.57 and 12.71% hydrogen, 7.28 and 7.55% nitrogen, and 8.77% oxirane oxygen, compared to calculated contents of 71.3% carbon, 12.5% hydrogen, 7.56% nitrogen, and 8.63% oxirane oxygen for tert-octylglycidylamine.

*Example 3*

A technical grade of tert-dodecylamine (Primene 81–R, Rohm and Haas Co.) with N.E.=190, 57.0 g., in 201.5 g. methanol was treated with 61.2 g. of epichlorohydrin, sampled, and kept at 20–25° for 50 hours, when analysis indicated 97% of the epichlorohydrin required for equimolar reaction with the amine had condensed.

Removal of the solvent and excess epichlorohydrin up to 40°/3 mm. left a light yellow fairly mobile oil (88 g.).

Of this, 56.5 g. was dehydrohalogenated with excess 40% aqueous sodium hydroxide in aqueous dimethyl sulfoxide. After stirring one hour at 30–35°, the crude product (43.5 g.) was isolated and 41.9 g. was distilled rapidly in vacuo. Since the starting amine is a mixture with a wide boiling range, the product (4 cuts) boiled from 82–127°/0.4–1.0 mm., $n_D^{25}$ 1.4542–1.4668.

The third cut, B.P. 110–115 (0.8–1.0 mm.), $n_D^{25}$ 1.4585, contained 6.77% oxirane oxygen, 74.41% carbon, and 13.10% hydrogen compared to 6.62% oxygen, 74.5% carbon, and 12.9% hydrogen, the calculated values for tert-dodecylglycidylamine, $C_{15}H_{31}NO$.

*Example 4*

This example illustrates the selective reaction of an anhydride with the epoxide linkage of a tert-alkylglycidylamine.

Tert-butylglycidylamine as prepared in Example 1, 12.9 g. (0.10 mole), was weighed into 51 g. (0.50 mole) of acetic anhydride. The temperature rose spontaneously to about 30° C. before the reaction was controlled by cooling. Analysis of aliquots taken immediately after mixing and then periodically indicated that 98% of the oxirane oxygen had reacted within 2 hours at 25–30°. No further decrease in titer was noted under these conditions; thus acetylation of the

grouping was not promoted even with the remaining four-fold excess of anhydride.

*Example 5*

This example illustrates the copolymerization of a tert-alkylglycidylamine with a cyclic anhydride to provide a linear basic polyester.

Tetrapropenylsuccinic anhydride (TPSA, Monsanto Chemical Co.), 13.3 g. (0.050 mole) was dissolved in 59.4 g. of dry toluene. To this solution at 35–40°, 6.5 g. (0.050 mole) of tert-butylglycidylamine (Example 1) was added and the mixture was sampled and heated to 110°, stirred and sampled periodically. After about an hour analysis showed that at least 93% of the added oxirane content had reacted and addition of a total of 1.5 g. of TPSA and heating another 1¾ hrs. increased this to 98%.

The viscous amber solution of the polyester (53.5% by weight in toluene) was evaluated for paper sizing as described in Example 7. A sample of the solution was allowed to stand in air until most of the toluene had evaporated. The hard polymer then dissolved very slowly in very dilute hydrochloric acid to form a turbid foamy viscous solution, from which it was precipitated by alkali.

Analysis of the toluene solution indicated that 100% of the basic amine nitrogen was still present, showing that no acylation of the amine occurred since such amides do not neutralize the reagent (hydrobromic acid in acetic acid).

Similarly, t-butylglycidylamine reacted exothermically with maleic anhydride to form a brittle solid polymer.

Succinic anhydride, 10.0 g. in 100 g. of ethyl acetate, reacted to the extent of 96.5% in 5.75 hrs. at 80° with 12.9 g. of t-butylglycidylamine, giving a somewhat viscous solution of the polymer (18.7% by weight).

*Example 6* n-Octadecenylsuccinic anhydride, 35.1 g., was heated with 10 g. of acetic anhydride to 125° for 45 min. to recyclize any free acid present, then aspirated to remove any acetic acid and unchanged anhydride. Toluene, 48 g., and 12.9 g. of t-butylglycidylamine were added and the solution was heated at 110–120° for 1 hr. when at least 97% of the added oxirane had reacted. Further heating did not increase the extent of reaction, i.e., the titer did not decrease further. The product solution contained 50% polyester by weight.

*Example 7*

This example illustrates the utility of a composition of this invention in the sizing of paper.

The preferred way of applying these materials to paper products is to add the composition in the desired amount to the aqueous pulp suspension which is to be used in making said paper. To that end then, some of the polyester products described above were tested according to the following standard test which is called the "wet end method": The "wet end method" may be described in general as follows:

There is dissolved or dispersed 0.75 g. of the test compound or composition (100% solids basis if a solution) in water, and this mixture is added to refined bleached Gatineau sulfite pulp (2% aqueous suspension, dry pulp basis). The thus treated pulp was brought to pH 9 with alkali (NaOH) and hand sheets of paper are made with the treated pulp on the Noble and Wood machine; hand sheets of untreated paper are also prepared.

The 50% by weight solution of polyester prepared in Example 6 from n-octadecenylsuccinic anhydride and tert-butylglycidylamine was added to a slurry of bleached Gatineau sulfite pulp at 1% based on the weight of the dry pulp. At the same time, 1% of the n-octadecyl propiolate was added as an emulsion of a xylene solution.

The pulp suspension was formed into hand sheets in the Noble and Wood machine and the sheets were further cured for 60 min. at 105° C. When tested as usual in the ink flotation test, the paper had 2800 sec. of sizing. The polyester solution of Example 5 prepared from tetrapropenylsuccinic anhydride and tertbutylglycidylamine, tested similarly, gave 375 sec. of ink resistant sizing.

I claim:
1. Compounds of the formula

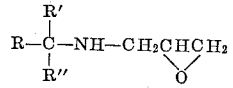

wherein R, R′, and R″ are alkyl groups, one of which contains from 1 to 21 carbon atoms and the other two of which are lower alkyl groups containing from 1 to 6 carbon atoms.

2. A compound according to claim 1 wherein R, R', and R'' are each a methyl group.

3. A compound according to claim 1 wherein R is a branched chain alkyl group, and R' and R'' are each methyl groups.

4. A compound as described in claim 3 wherein R is a 2,2-dimethyl-1-propyl group.

5. N-(2,3-epoxypropyl)-tert-dodecylamine.

6. A method for preparing a mono-substituted monoglycidylamine which comprises contacting and reacting an epihalohydrin with a tert-alkylamine in the presence of a substantially non-aqueous hydroxyl-group containing solvent at a temperature of from about 0° C. to 50° C. for a time sufficient to form at 1:1 adduct of the tert-alkylamine and the epihalohydrin, and treating the resulting reaction product with aqueous basic material sufficient to dehydrohalogenate said adduct.

7. A process according to claim 6 wherein the tert-alkylamine is tert-butylamine and the epihalohydrin is epichlorohydrin.

8. A process according to claim 6 wherein the tert-alkylamine is tert-octylamine and the epihalohydrin is epichlorohydrin.

9. A process according to claim 6 wherein the tert-alkylamine is tert-dodecylamine and the epihalohydrin is epichlorohydrin.

10. A polyester of a cyclic acid anhydride selected from the group consisting of succinic acid and glutaric acid anhydrides having aliphatic hydrocarbon side chains of from 6 to 20 carbon atoms with an amine of the formula

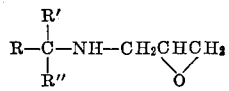

wherein R, R', and R'' are alkyl groups, one of which contains from 1 to 21 carbon atoms, and the other two of which are lower alkyl groups having from 1 to 6 carbon atoms, said polyester containing from about 0.25 up to about 1 molar proportion of said cyclic acid anhydride moiety for each molar proportion of amine moiety.

11. A polyester as described in claim 10 wherein the aliphatic hydrocarbon radical containing cyclic acid anhydride is an alkenylsuccinic anhydride having from 6 to 20 carbon atoms in the alkenyl radical and the amine is tert-butyl primary amine.

12. A polyester as described in claim 11 wherein the alkenylsuccinic anyhdride is dodecenylsuccinic anhydride and the amine is N-(2,3-epoxypropyl)-tert-butylamine.

13. A polyester as described in claim 11 wherein the alkenylsuccinic anhydride is n-octadecenylsuccinic anhydride and the amine is N-(2,3-epoxypropyl)-tert-butylamine.

References Cited by the Examiner

UNITED STATES PATENTS

| 1,977,253 | 5/1933 | Stallman | 260—348 |
| 3,091,537 | 5/1963 | Burness | 260—78.4 |

FOREIGN PATENTS

| 447,843 | 1/1938 | Great Britain. |
| 500,300 | 2/1939 | Great Britain. |

JOSEPH L. SCHOFER, *Primary Examiner.*

DONALD E. CZAJA, *Examiner.*

L. WOLF, *Assistant Examiner.*